United States Patent [19]

Gulbins et al.

[11] Patent Number: 4,894,261

[45] Date of Patent: Jan. 16, 1990

[54] PRODUCTION OF A MULTILAYER COATING

[75] Inventors: Erich Gulbins, Heidelberg; Gregor Ley, Wattenheim, both of Fed. Rep. of Germany

[73] Assignee: BASF Aktiengesellschaft, Ludwigshafen, Fed. Rep. of Germany

[21] Appl. No.: 216,614

[22] Filed: Jul. 8, 1988

[30] Foreign Application Priority Data

Jul. 23, 1987 [DE] Fed. Rep. of Germany ....... 3724369

[51] Int. Cl.$^4$ .............................................. B05D 3/02
[52] U.S. Cl. .................................. 427/379; 427/407.1
[58] Field of Search ................... 427/388.4, 407.1, 409, 427/379

[56] References Cited

U.S. PATENT DOCUMENTS

| | | | |
|---|---|---|---|
| 3,345,336 | 10/1967 | Kuhlkamp et al. | 260/63 |
| 4,016,127 | 4/1977 | Larsson et al. | 427/412 X |
| 4,061,845 | 12/1977 | Fabris et al. | 156/331.8 X |
| 4,210,565 | 7/1980 | Emmons | 422/388.3 |
| 4,250,070 | 2/1981 | Ley et al. | 524/192 X |
| 4,403,003 | 9/1983 | Backhouse | 427/407.1 |
| 4,539,363 | 9/1985 | Backhouse | 524/460 |

*Primary Examiner*—Michael Luisignan
*Attorney, Agent, or Firm*—Keil & Weinkauf

[57] ABSTRACT

A multilayer coating is produced on a substrate by a process in which an aqueous dispersion containing (A) a carbonyl-containing copolymer of monoolefinically unsaturated compounds, not less than 10% by weight of which have carbonyl groups which react with hydrazide groups, and (B) polyhydrazides, is applied as a base coat to the substrate, the water is flashed off and one or more further conventional coats are applied to this base coat as a dispersion or solution, the solvent is flashed off and, if required, the resulting multilayer coating is baked for from 10 to 60 minutes at from 70° to 180° C.

5 Claims, No Drawings

PRODUCTION OF A MULTILAYER COATING

The present invention relates to a process for the production of a multilayer coating using an aqueous dispersion containing (A) a carbonyl-containing copolymer of monoolefinically unsaturated compounds, not less than 10% by weight of which have carbonyl groups which react with hydrazide groups, and
(B) polyhydrazides, as a base coat of the multilayer coating.

Processes for the production of multilayer coatings are known. For example, European Patent No. 38,127 describes a process for the production of a multilayer coating on a substrate surface, where an aqueous dispersion of highly crosslinked polymer microparticles is used as the base coat. The disadvantage of this process is that the highly crosslinked particles do not possess good film-forming properties and may lead to defects in the surface.

It is an object of the present invention to provide stable aqueous dispersions for the production of the base coat in the production of multilayer coatings, the said dispersions having good film-forming properties and not undergoing crosslinking until film formation takes place.

We have found that this object is achieved by a process for the production of a multilayer coating on a substrate, wherein an aqueous dispersion containing (A) a carbonyl-containing copolymer of monoolefinically unsaturated compounds, not less than 10% by weight of which have carbonyl groups which react with hydrazide groups, and
(B) polyhydrazides, is applied as a base coat to the substrate, the water is flashed off and one or more further conventional coats are applied to this base coat, as a dispersion or solution, the solvent is flashed off and, if required, the resulting multilayer coating is baked for from 10 to 60 minutes at from 70 to 180° C.

The particular advantage of this process is that crosslinking of the base coat takes place essentially only during production of the film, when the polyhydrazides dissolved in the aqueous phase react with the keto/aldehyde groups of the copolymer after the water has evaporated. Hence, the dispersion has a long shelf life and good film-forming properties. Films produced therefrom have excellent gloss stability in the humidity test (DIN 50,017) and high resistance to aromatics.

The aqueous dispersions for the base coat are generally known and do not form a subject of the present invention. For example, German Laid-Open Application DOS 1,495,706 describes a process for the preparation of keto-containing polymers, in which unsaturated polymerizable keto compounds are homopolymerized or copolymerized and crosslinked with polyfunctional hydrazides.

Suitable components (A) are carbonyl-containing copolymers. These include copolymers of (meth)acrylates of alcohols of 1 to 20 carbon atoms, such as methyl, ethyl, propyl, n-, iso- and tert-butylcyclohexyl, 2-ethylhexyl, decyl, lauryl and stearyl (meth)acrylate, with, for example, $\alpha,\beta$-monoolefinically unsaturated carboxylic acids, such as acrylic acid, methacrylic acid, maleic acid, maleic half-esters or maleic anhydride, where maleic half-esters are formed subsequently by reaction with alcohols, and vinyl esters of carboxylic acids of 1 to 20 carbon atoms, such as vinyl formate, acetate, propionate, butyrate, laurate and stearate, vinyl ethers of 3 to 22 carbon atoms, such as methyl, ethyl, butyl, hexyl or octadecyl vinyl ether, vinylaromatics of 8 to 18 carbon atoms, such as styrene, methylstyrene, vinyltoluenes, tert-butylstyrene or halostyrenes, olefins of 2 to 20 carbon atoms, such as ethylene, propylene, n-butylene, isobutylene, diisobutene, triisobutene, oligopropylenes, vinyl halides, such as vinyl chloride or bromide, and vinylidene chloride, allyl ethers, allyl alcohols and allyl esters. Methyl, ethyl, n-butyl, isobutyl and 2-ethylhexyl (meth)acrylate, acrylic acid, methacrylic acid, vinyl propionate, styrene and vinyltoluene are preferred.

The carbonyl groups can be introduced into the copolymers (A) by the concomitant use of copolymerizable carbonyl compounds, for example $\alpha,\beta$-monoolefinically unsaturated aldehydes and/or ketones, such as acrolein, methacrolein, vinyl alkyl ketones where alkyl is of 1 to 20 carbon atoms, formylstyrene, (meth)acryloxyalkanals and -alkanols, whose preparation is described in, for example, German Laid-Open Application DOS 2,722,097, N-oxoalkyl (meth)acrylamides, as described in, inter alia, U.S. Pat. No. 4,226,007 and German Laid-Open Applications DOS 2,061,213 and DOS 2,207,209, eg. N-3-oxobutylacrylamide and -methacrylamide, N-1,1-dimethyl-3-oxobutyl(meth)acrylamide, diacetone(meth)acrylamide and N-3-oxo1,1-dibutyl-2-propylhexylacrylamide, as well as acetonyl and diacetone (meth)acrylate or acrylamidopivalaldehyde or mixtures of these comonomers. 3-Oxaalkyl (meth)acrylates and N-3-oxoalkyl(meth)acrylamides and methyl vinyl ketone and methacrolein or acrolein are preferred.

For the preparation of the copolymers (A), it is also possible for monomers containing other functional groups to be concomitantly used, for example those containing hydroxyl groups, such as hydroxyalkyl(meth)acrylates, eg. 2-hydroxypropyl acrylate and methacrylate, 2-hydroxyethyl (meth)acrylate and 4-hydroxybutyl (meth)acrylate. The copolymers (A) generally have K values of from 10 to 200, preferably from 10 to 80, determined according to DIN 53,726.

The content of carboxyl groups in component (A) should be chosen so that, after neutralization or partial neutralization, the product can be diluted with water or dispersed in water. The minimum content of carboxyl groups required also depends on the composition of the polymer (A), hydrophobic components, eg. styrene, requiring a higher carboxyl content than more hydrophilic components, such as lower acrylates. The copolymers (A) generally have acid numbers of about 5–250, preferably 20–100. In the preparation of the copolymers (A), in general from 10 to 50, preferably from 10 to 20, % by weight of copolymerizable carbonyl compounds are used.

Examples of suitable polyhydrazides (B) are dihydrazides of organic di- or oligocarboxylic acids. Examples are malonic, succinic, glutaric, adipic, pimelic, suberic, azelaic, sebacic, undecanedioic, dodecanedioic, tridecanedioic, tetradecanedioic, pentadecanedioic, hexadecanedioic and 2-methyltetradecanedioic dihydrazide, as well as methyl-, ethyl-, propyl-, butyl-, hexyl, octyl, 2-ethylhexyl-, nonyl-, decyl-, undecyl- and dodecylmalonic dihydrazide, methyl-, ethyl-, propyl-, butyl-, hexyl-, heptyl- and octylsuccinic and -glutaric dihydrazide, cyclohexanedicarboxylic dihydrazide and cyclohexylmethylmalonic dihydrazide, terephthalic dihydrazide, phenylsuccinic dihydrazide, cinnamylmalonic dihydrazide and benzylmalonic dihydrazide, pentane-1,3,5-tricarboxylic trihydrazide, hex-4-ene-1,2,6-tricarboxylic trihydrazide, 3-cyanopentane-1,3,5-tricarboxylic trihydrazide, dicyanofumaric dihydrazide and the di- and oligohydrazides of dimerized or oligomerized unsaturated fatty acids. Succinic, glutaric and adipic dihydrazide are preferred.

Component (A) is combined with component (B) in general in amounts such that the ratio of the number of equivalents of hydrazide groups of component (B) to that of carbonyl groups of component (A) in the reaction is 0.1 : 1, preferably 0.1 : 0.9.

The solids contents of the aqueous dispersions are from 20 to 60, preferably from 30 to 50, % by weight. It is also possible to use up to 30% by weight, based on the solids content, of pigments and/or extenders and up to 15% by weight, based on the finished coating, of solvents and further assistants.

The aqueous dispersions are applied to the substrate by known methods, for example by brushing, spraying, dipping, knife-coating or roller coating and the water is flashed off at from room temperature to 50° C. for from 1 to 10, preferably from 2 to 5, minutes, the base coat forming a film and undergoing crosslinking. One or more further coats based on polymers, polyadducts or polycondensates, for example polyacrylates, polyurethanes, melamine resins, urea resins or polyesters, are applied as dispersions or solutions to this base coat and flashed off at from room temperature to 50° C. for from 1 to 20 minutes. Further top coats can be applied in a similar manner.

Where 2-component systems based on polyadducts are used as the top coat, the multilayer coating need not be baked. For all other systems, baking is carried out for from 10 to 60 minutes at from 70 to 180° C., preferably from 70 to 160° C., after the final coat of the multilayer coating has been applied.

EXAMPLE 1

1,020 g of fully demineralized water were initially taken in a reaction vessel and heated to 85° C. Thereafter, 10% by weight of a feed 1 and 5% by weight of a feed 2 were added. 15 minutes after the polymerization had started, the remainder of the two feeds were introduced into the reactor in the course of 2 hours. Feed 1 was an emulsion of 480 g of fully demineralized water, 71.5 g of a 35% strength by weight aqueous solution of the sodium salt of an acidic sulfuric ester of an adduct of 25 moles of ethylene oxide with nonylphenol, 585 g of n-butyl acrylate, 345 g of styrene, 330 g of methyl methacrylate, 180 g of diacetoneacrylamide and 60 g of acrylic acid. A solution of 7.5 g of sodium peroxodisulfate in 243 g of fully demineralized water served as feed 2. After the end of the additions, the mixture was kept at 85° C. for a further hour. It was then cooled to room temperature and filtered over calico. A finely divided dispersion having a solids content of about 46% by weight, a pH of about 2 and a mean particle size D(NS) of about 140 nm according to nanosizer measurement was obtained.

EXAMPLE 2

1,020 g of fully demineralized water were initially taken in a reaction vessel and heated to 85° C. Thereafter, 10% by weight of a feed 1 and 5% by weight of a feed 2 were added. 15 minutes after the polymerization had started, the remainder of the two feeds were introduced into the reactor in the course of 2 hours. Feed 1 was an emulsion of 480 g of fully demineralized water, 71.5 g of a 35% strength by weight aqueous solution of the sodium salt of an acidic sulfuric ester of an adduct of 25 moles of ethylene oxide with nonylphenol, 585 g of n-butyl acrylate, 315 g of styrene, 300 g of methyl methacrylate, 240 g of diacetoneacrylamide and 60 g of acrylic acid. A solution of 7.5 g of sodium peroxodisulfate in 243 g of fully demineralized water served as feed 2. After the end of the additions, the mixture was kept at 85° C. for a further hour. It was then cooled to room temperature and filtered over calico. A finely divided dispersion having a solids content of about 46% by weight, a pH of about 2.1 and a D(NS) of 140 nm was obtained.

EXAMPLE 3

The procedure described in Example 1 was followed, except that, instead of the diacetoneacrylamide, 180 g of the methacrylate of 2-oxobutan-1-ol were used. The data of the resulting dispersion corresponded to those of Example 1.

EXAMPLE 4

The following mixtures were prepared separately:

1. 27.0 g of a commercial aluminum-based or iron-based non-leafing metallic pigment paste suitable for waterborne coatings, 0.1 g of 2,4,7,9-tetramethyl-5-decyne-4,7-diol, 50% strength in ethylene glycol, and 16.0 g of butylglycol were carefully mixed (total amount: 43.1 g).

2. 199.7 g of the dispersion from Example 1 were brought to pH 7.2 with 1.8 g of 25% strength by weight ammonia. 52.9 g of a 10% strength by weight aqueous solution of adipic dihydrazide, 1.6 g of a commercial fluorine surfactant (Fluorad® FC 170 C from 3M), dissolved 1 : 1 in isopropanol, 1.6 g of corrosion inhibitor 562 from Erbslöh (Düsseldorf) (organic ammonium nitrite solution) and 1.6 g of 2,4,7,9-tetramethyl-5-decyne-4,7-diol, 50% strength by weight in ethylene glycol, were incorporated in succession into the dispersion (total amount 259.2 g).

3. A thickener solution (total amount: 160.0 g) was prepared from 146.3 g of fully demineralized water, 0.6 g of 2,4,7,9-tetramethyl-5-decyne-4,7-diol, 50% strength by weight in ethylene glycol, and 13.1 g of the thickener Collacral® PU 85 from BASF AG, 25% strength by weight in water/butylglycol (polyurethane thickener).

For the preparation of the ready-to-spray coating, the following procedure was adopted: 60.0 g of dispersion mixture 2. were stirred rapidly into 42.3 g of the non-leafing metallic pigment paste described under 1., followed by a further 69.6 g of the same dispersion mixture 2., which were stirred in slowly. Thereafter, 65.0 g of thickener solution 3., a further 129.6 g of dispersion mixture 2. and 95.0 g of thickener solution 3. were incorporated. After the addition of 50.0 g of fully demineralized water, a total amount of 512.3 g of a ready-to-spray coating having a pH of 7.4 and a viscosity of about 16 seconds (efflux time in DIN 4 cup) was obtained.

The ready-to-spray coating was applied to a substrate in a known manner by means of a compressed-air spray pistol so that the applied coating film was high-hiding, ie. not less than 8–10 μm thick, after drying. After solvent flashoff at room temperature for 1 minute, the coating film was dried for 5 minutes at 50° C. in a through-circulation drier. An unpigmented mixture (clear coat) of 61.9 g of an externally crosslinking hydroxyl-containing polyacrylate, 60% strength by weight in Solvesso® 100 (eg. Luprenal® LR 8674 from BASF AG), 36.9 g of a melamine/formaldehyde resin etherified with isobutanol, about 53% strength by weight in isobutanol (eg. Luwipal® 015 from BASF AG) and 1.0 g of a silicone oil (silicone oil A from Bayer AG) was applied to this base coat to give a film which was about 35 μm thick when dry, application being effected by means of a compressed-air spray gun. After flashoff for 15 minutes at room temperature, the resulting multilayer coating was baked (crosslinked) for 30 minutes in a through-circulation drier at 130° C.

The multilayer coating formed was subjected to a humidity test according to DIN 50,017, and the gloss (measured with Multigloss (Erichsen), angle 20° C.) was used as a measure of the changes under the conditions of DIN 50,017:
0 value: 85%
After 10 d: 80%
After 20 d: 82%
After 30 d: 82%

EXAMPLE 5

The following mixtures were prepared separately:
1. 27.0 g of a commercial aluminum-based or iron-based non-leafing metallic pigment base suitable for waterborne coatings, 0.3 g of 2,4,7,9-tetramethyl-5-decyne-4,7-diol, 50% strength by weight in ethylene glycol, 0.2 g of a commercial fluorine surfactant (Fluorad FC 170 C from 3M) and 16.0 g of butylglycol were carefully mixed (total amount: 43.5 g).
2. 200.0 g of the dispersion from Example 1 were mixed with 6.0 g of a 50% strength by weight aqueous solution of triethanolamine (pH about 7.2).

5.3 g of adipic dihydrazide, 1.4 g of a conventional fluorine surfactant (Fluorad FC 170 C from 3M), 1.6 g of a corrosion inhibitor 5 62 from Erbslöh (Düsseldorf) (organic ammonium nitrite solution), 1.4 g of 2,4,7,9-tetramethyl-5-decyne-4,7-diol, 50% strength by weight in ethylene glycol, and 47.3 g of fully demineralized water were incorporated in succession into the dispersion (total amount 263.0 g).

A thickener solution (160.0 g) was prepared from 146.3 g of fully demineralized water, 0.6 g of 2,4,7,9-tetramethyl-5-decyne-4,7-diol, 50% strength by weight in ethylene glycol, and 13.1 g of the thickener Collacral PU 85 from BASF, 25% strength by weight in water/butylglycol (polyurethane thickener).

The following procedure was adopted for the preparation of the ready-to-spray coating.

60.0 g of dispersion mixture 2. was rapidly stirred into 43.5 g of the non-leafing metallic pigment paste described under 1., followed by a further 71.5 g of the same dispersion mixture 2., which were stirred in slowly. Thereafter, 65.0 g of thickener solution 3., a further 131.5 g of dispersion mixture 2. and 95.0 g of thickener solution 3. were incorporated. After the addition of 35.0 g of fully demineralized water, a total amount of 501.5 g of a ready-to-spray coating having a pH of 7.3 and a viscosity of about 16 seconds (efflux time in DIN 4 cup) was obtained.

The ready-to-spray coating was applied to a substrate in a known manner using a compressed-air spray gun so that the applied coating film was high-hiding, ie. not less than 8–10 μm thick, after drying. After flashoff at room temperature for 1 minute, the coating film was dried for 5 minutes at 50° C. in a through-circulation drier.

An unpigmented mixture (clear coat) of 61.9 of an externally crosslinking hydroxyl-containing polyacrylate, 60% strength by weight in Solvesso 100 (eg. Luprenal LR 8674 from BASF AG), 36.9 g of a melamine/formaldehyde resin etherified with isobutanol, about 53% strength by weight in isobutanol (eg. Luwipal 015 from BASF AG) and 0.1 g of a silicone oil (silicone oil A from Bayer AG) was applied to this base coat by means of a compressed-air gun to give a film which was about 35 μm thick when dry. After flashoff for 15 minutes at room temperature, the resulting multilayer coating was baked (crosslinked) for 30 minutes in a through-circulation drier at 130° C.

The multilayer coating formed was subjected to a humidity test according to DIN 50,017, and the gloss (measured with Multigloss (Erichsen), angle 20° C.) was used as a measure of the changes under the conditions of DIN 50,017:
0 value: 86%
After 10 d: 80%
After 20 d: 82%
After 30 d: 80%

EXAMPLE 6

The following mixtures were prepared separately:
1. 27.0 g of a commercial aluminum-based or iron-based non-leafing metallic pigment paste suitable for waterborne coatings, 0.1 g of 2,4,7,9-tetramethyl-5-decyne-4,7-diol, 50% strength by weight in ethylene glycol, and 16.0 g of butylglycol were carefully mixed.
2. 196.0 g of the dispersion from Example 2 were brought to pH 7.3 with 1.9 g of 25% strength by weight ammonia. 70.3 g of a 10% strength by weight aqueous solution of adipic hydrazide, 1.6 g of a commercial fluorine surfactant (Fluorad FC 170 C. from 3M), 1.6 g of a corrosion inhibitor 562 from Erbslöh (Düsseldorf) (organic ammonium nitrite solution) and 1.6 g of 2,4,7,9-tetramethyl-5-decyne-4,7-diol, 50% strength by weight in ethylene glycol, were incorporated in succession into the dispersion (total amount 259.2 g).
3. A thickener solution (total amount 160.0 g) was prepared from 146.3 g of fully demineralized water, 0.6 g of 2,4,7,9-tetramethyl-5-decyne-4,7-diol, 50% strength by weight in ethylene glycol, and 13.1 g of the thickener Collacral PU 85 from BASF AG, 25% strength by weight in water/butylglycol (polyurethane thickener).

For the preparation of the ready-to-spray coating, the following procedure was adopted: 60.0 g of the dispersion mixture 2. were stirred rapidly into 43.1 g of the non-leafing metallic pigment paste described under 1., followed by a further 76.5 g of the same dispersion mixture 2., which were stirred in slowly. Thereafter, 65.0 g of thickener solution 3., a further 136.5 g of dispersion mixture 2. and 95.0 g of thickener solution 3. were incorporated. After the addition of 30.0 g of fully demineralized water, a total amount of 506.1 g of a ready-to-spray coating having a pH of 7.3 and a viscosity of about 16 seconds (efflux time in DIN 4 cup) was obtained.

The ready-to-spray coating was applied in a known manner to a substrate by means of a compressed-air spray gun so that the applied coating film was high-hiding, ie. not less than 8–10 μm thick, after drying. After flashoff at room temperature for 1 minute, the coating film was dried for 5 minutes at 50° C. in a through-circulation drier.

An unpigmented mixture (clear coat) of 61.9 g of an externally crosslinking hydroxyl-containing polyacrylate, 60% strength in Solvesso 100 (eg. Luprenal LR 8674 from BASF AG), 36.9 g of a melamine/formaldehyde resin etherified with isobutanol, about 53% strength in isobutanol (eg. Luwipal 015 from BASF AG), and 0.1 g of a silicone oil (silicone oil A from Bayer AG) was applied to this base coat by means of a compressed-air gun to give a film which was about 35 μm thick when dry. After flashoff for 15 minutes at room temperature, the resulting multilayer coating was baked (crosslinked) for minutes in a through-circulation drier at 130° C.

The multilayer coating formed was subjected to a humidity test according to DIN 50,017, and the gloss (measured with Multigloss (Erichsen), angle 20° C.) was used as a measure of the changes under the conditions of DIN 50,017:

0 value: 86%
After 10 d: 81%
After 20 d: 80%

EXAMPLE 7

The following mixtures were prepared separately:

1. 27.0 g of a commercial aluminum-based or iron-based non-leafing metallic pigment paste suitable for waterborne coats, 0.1 g of 2,4,7,9-tetramethyl-5-decyne-4,7-diol, 50% strength by weight in ethylene glycol, and 16.0 g of butylglycol were mixed carefully.

2. 200.6 g of the dispersion from Example 3 were brought to pH 7.2 with 1.8 g of 25% strength by weight ammonia. 52.9 g of a 10% strength by weight aqueous solution of adipic dihydrazide, 1.6 g of a commercial fluorine surfactant (eg. Fluorad FC 170 C from 3M), dissolved 1 : 1 in isopropanol, 1.6 g of a corrosion inhibitor 562 (from Erbslöh (Düsseldorf, organic ammonium nitrite solution) and 1.6 g of 2,4,7,9-tetramethyl-5-decyne-4,7-diol, 50% strength by weight in ethylene glycol, were incorporated in succession into the dispersion (total amount: 260.1 g).

3. A thickener solution (total amount 160.0 g) was prepared from 146.3 g of fully demineralised water, 0.6 g of 2,4,7,9-tetramethyl-5-decyne-4,7-diol, 50% strength by weight in ethylene glycol, and 13.1 g of the thickener Collacral PU 85 from BASF AG), 25% strength by weight in water/butylglycol (polyurethane thickener).

For the preparation of the ready-to-spray coating, the following procedure was adopted: 60.0 g of dispersion mixture 2. were first stirred rapidly into 43.1 g of the non-leafing metallic pigment paste described under 1., followed by a further 69.6 g of the same dispersion mixture 2., which was stirred in slowly. Thereafter, 65.0 g of thickener solution 2., a further 129.6 g of dispersion mixture 2. and 95.0 g of thickener solution 3. were incorporated. After the addition of 50.0 g of fully demineralized water, a total amount of 512.3 g of a ready-to-spray coating having a pH of 7.4 and a viscosity of about 16 seconds (efflux time in DIN 4 cup) was obtained.

The ready-to-spray coating was applied to a substrate in a known manner by means of a compressed-air spray gun so that the applied coating film was highhiding, ie. not less than 8–10 μm thick, after drying. After flashoff at room temperature for 1 minute, the coating film was dried for 5 minutes at 50° C. in a through-circulation drier. An unpigmented mixture (clear coat) of 61.9 g of an externally crosslinking hydroxyl-containing polyacrylate, 60% strength by weight in Solvesso 100 (eg. Luprenal LR 8674 from BASF AG), 36.9 g of a melamine/formaldehyde resin etherified with isobutanol, about 53% strength by weight in isobutanol (eg. Luwipal 015 from BASF AG) and 0.1 g of a silicone oil (silicone oil A from Bayer AG) was applied to this base coat by means of a compressed-air gun to give a film which was about 35 μm thick when dry. After flashoff for 15 minutes at room temperature, the resulting multilayer coating was baked (crosslinked) for 30 minutes in a through-circulation drier at 130° C.

The multilayer coating formed was subjected to a humidity test according to DIN 50,017, and the gloss (measured with Multigloss from Erichsen, angle of incidence 20° C.) was used as a measure of the change under the conditions of DIN 50,017.

0 value 84%
After 10 d: 78%.

We claim:

1. A process for the production of a multilayer coating on a substrate which comprises:
   applying to a substrate as a basecoat an aqueous dispersion containing effective amounts of
   (A) a carbonyl-containing copolymer of mono-olefinically unsaturated compounds, not less than 10% by weight of which have carbonyl groups which react with hydrazide groups, and
   (B) polyhydrazides,
   flashing off the water from the dispersion, whereupon the carbonyl groups of the copolymer react with the polyhydrazides to form a crosslinked film on the substrate, and thereafter
   applying one or more further coats to the base-coat.

2. The process of claim 1, wherein a copolymer of (meth)acrylates, (meth)acrylic acid, vinyl-aromatics and copolymerizable ketones and/or aldehydes is used as comaponent (A).

3. The process of claim 1, wherein a dihydrazide of an organic di- or oligocarboxylic acid of 3 to 36 carbon atoms is used as component (B).

4. The process of claim 2, wherein a dihydrazide of an organic di- or oligocarboxylic acid of 3 to 36 carbon atoms is used as component (B).

5. The process of claim 1, wherein the basecoat and the additional coats are baked for from 10 to 60 minutes at from 70 to 180° C.

* * * * *